United States Patent
Damiano

(10) Patent No.: US 12,436,113 B2
(45) Date of Patent: Oct. 7, 2025

(54) X-RAY DEVICE WITH FOLDED FIELD-OF-VIEW

(71) Applicant: Lumafield, Inc., Cambridge, MA (US)

(72) Inventor: Adam P. Damiano, Somerville, MA (US)

(73) Assignee: Lumafield, Inc., Cambridge, MA (US)

(*) Notice: Subject to any disclaimer, the term of this patent is extended or adjusted under 35 U.S.C. 154(b) by 210 days.

(21) Appl. No.: 18/232,688

(22) Filed: Aug. 10, 2023

(65) Prior Publication Data
US 2025/0052698 A1    Feb. 13, 2025

(51) Int. Cl.
G01N 23/04      (2018.01)
G01N 23/083     (2018.01)
G06T 17/00      (2006.01)
H04N 23/30      (2023.01)
H04N 23/58      (2023.01)

(52) U.S. Cl.
CPC .......... *G01N 23/04* (2013.01); *G01N 23/083* (2013.01); *G06T 17/00* (2013.01); *H04N 23/30* (2023.01); *H04N 23/58* (2023.01); *G01N 2223/505* (2013.01)

(58) Field of Classification Search
CPC .......... G01N 23/04; G01N 23/083; G01N 2223/505; G06T 17/00; H04N 23/30; H04N 23/58; G01T 1/20186; G01T 1/2002
See application file for complete search history.

(56) References Cited

U.S. PATENT DOCUMENTS

| | | | |
|---|---|---|---|
| 2002/0031203 A1* | 3/2002 | Polichar | G01T 1/2914 378/98.2 |
| 2010/0072378 A1 | 3/2010 | Cannon | |
| 2013/0148787 A1 | 6/2013 | Campbell | |
| 2023/0148975 A1 | 5/2023 | Damiano et al. | |

FOREIGN PATENT DOCUMENTS

| | | |
|---|---|---|
| CN | 112456537 | 3/2021 |
| WO | WO 2023/091435 | 5/2023 |

OTHER PUBLICATIONS

International Search Report and Written Opinion in International Appln. No. PCT/US2024/040962, mailed on Oct. 16, 2024, 14 pages.
Li et al., "Flexible, High Scintillation Yield Cu3Cu2I5 Film Made of Ball-Milled Powder for High Spatial Resolution X-Ray Imaging," Advanced Optical Materials, Jan. 2022, 10(5):1-6.

* cited by examiner

*Primary Examiner* — Kiho Kim
(74) *Attorney, Agent, or Firm* — Fish & Richardson P.C.

(57) ABSTRACT

An X-ray device includes an X-ray source, a scintillator, a single mirror, and a camera. The camera has a field-of-view around an optical axis of the camera. The single mirror fully contains the field-of-view as the field-of-view is folded by the single mirror toward the scintillator. The single mirror is positioned at an angle with respect to a plane that is normal to the optical axis at a point where the optical axis intersects the single mirror. The angle is decreased from forty-five degrees to reduce a volume of the folded field-of-view of the camera. The angle is greater than or equal to a threshold angle that prevents triple specular reflections of light between the single mirror and the scintillator.

15 Claims, 6 Drawing Sheets

X-RAY DEVICE WITH FOLDED FIELD-OF-VIEW

BACKGROUND

X-ray devices, such as computed tomography (CT) devices, may be used to detect defects and/or damage in an object without disassembling the object. However, current X-ray detection equipment needs improvement because they are cost-prohibitive for certain analyses, too large or bulky to be used in certain situations, unable to form images of an object's interior with the appropriate resolution, and other problems known in the field. Set forth herein are solutions to these and other problems known in the field.

SUMMARY

X-ray devices that create three-dimensional (3D) reproductions of a scan target can be large and bulky due to requirements on the optical path length of light used to image the scan target. However, the size of an X-ray device with a decoupled detector, e.g., an X-ray device with a non-minimal path length between the scan target and the detector, can be reduced by using a folding mirror, e.g., a mirror angled relative to other components in the X-ray device to reduce the dimensions of the X-ray device to be smaller than the optical path length. The folding mirror "folds" the field-of-view of a camera within the X-ray device, such that the camera can receive light that is "off-axis," e.g., not parallel and coincident with the optical axis of the camera. Generally, the smaller the "folded" field-of-view, the smaller the X-ray device can be.

Problems arise, however, when optimizing the internal geometry of the X-ray device for as small a folded field-of-view as possible. For example, determining the relative orientations of the scintillator, mirror, and camera to minimize the folded field of view can lead to orientations and/or positions of scintillator, mirror, and camera where the light from the scintillator reflects off of the mirror and then the scintillator before being directed to the camera. The camera can mistakenly identify the light reflected from the scintillator (e.g., a triple reflection between mirror and scintillator) for light that has travelled directly from the scintillator to the mirror and then from the mirror directly to the camera, which can cause errors in the 3D reconstruction.

The present disclosure describes the structural constraints on an X-ray device to minimize the size of a detection subsystem in an X-ray device, while still avoiding triple reflections. Accordingly, the present disclosure is aimed at balancing benefits and disadvantages of reducing the size of the detection subsystem, which includes the scintillator, mirror, and camera, in an X-ray device.

In general, innovative aspects of the subject matter described in this specification can be embodied an X-ray device that includes: an X-ray source configured to emit X-rays: a scintillator arranged to absorb, on a first side of the scintillator, the X-rays after interaction with an object that has been placed in the X-ray device, the scintillator being configured to emit light from a second side of the scintillator in response to absorption of the X-rays: a single mirror arranged to reflect the light from the second side of the scintillator toward a camera; and the camera arranged to receive the light reflected from the single mirror. The camera can have a field-of-view around an optical axis of the camera. The single mirror can be large enough to fully contain the field-of-view as the field-of-view is folded by the single mirror toward the scintillator. The single mirror can be positioned at an angle with respect to a plane that is normal to the optical axis at a point where the optical axis intersects the single mirror. The angle can be decreased from forty-five degrees to reduce a volume of the folded field-of-view of the camera. The angle can be greater than or equal to a threshold angle that prevents triple specular reflections of light between the single mirror and the scintillator, the threshold angle being set in accordance with (i) a first distance along the optical axis between the camera and the scintillator, (ii) a second distance along the optical axis between the single mirror and the scintillator, and (iii) a size of the scintillator.

These and other implementations can each optionally include one or more of the following features.

In some implementations, the angle of the single mirror with respect to the plane is less than an additional threshold angle that prevents a combination of double specular reflections of light off of the single mirror and a single diffuse reflection of light off of the scintillator.

In some implementations, the angle of the single mirror with respect to the plane is greater than an additional threshold angle that prevents a combination of double specular reflections of light off of the single mirror and a single diffuse reflection of light off of the scintillator.

In some implementations, a bounding box volume of the folded field-of-view of the camera is 78% of a bounding box volume of an unfolded field-of-view of the camera.

In some implementations, a field-of-view of the camera is 20 by 31 square degrees.

In some implementations, the X-ray device further includes a shroud positioned to block stray light from affecting the camera.

In some implementations, the shroud is positioned between the X-ray source and the camera.

In some implementations, the X-ray device further includes a motion system to move the camera, the object, or both during a scan.

In some implementations, a system includes the X-ray device and a computer programmed to execute an algorithm to perform three-dimensional reconstruction of the object using data generated by the light received by the camera.

Particular embodiments of the subject matter described in this specification can be implemented to realize one or more of the following advantages. In some implementations, incorrect bright or dark spots that are not representative of a scan target can be avoided, thus improving a 3D reconstruction of a scan target. In general, artifacts (e.g., a bright spot) that would otherwise appear in one or more radiographs acquired by the camera can be reduced (or avoided entirely) thus avoiding errors being added to the reconstructed volume of a scan target, while reducing the size of the detector assembly, and optionally reducing the size of the X-ray device including the detector assembly. In some implementations, all dimensions of a detection subsystem can be less than the optical path length of light traveling inside of the detection subsystem.

DETAILED DESCRIPTION

Figure 1:
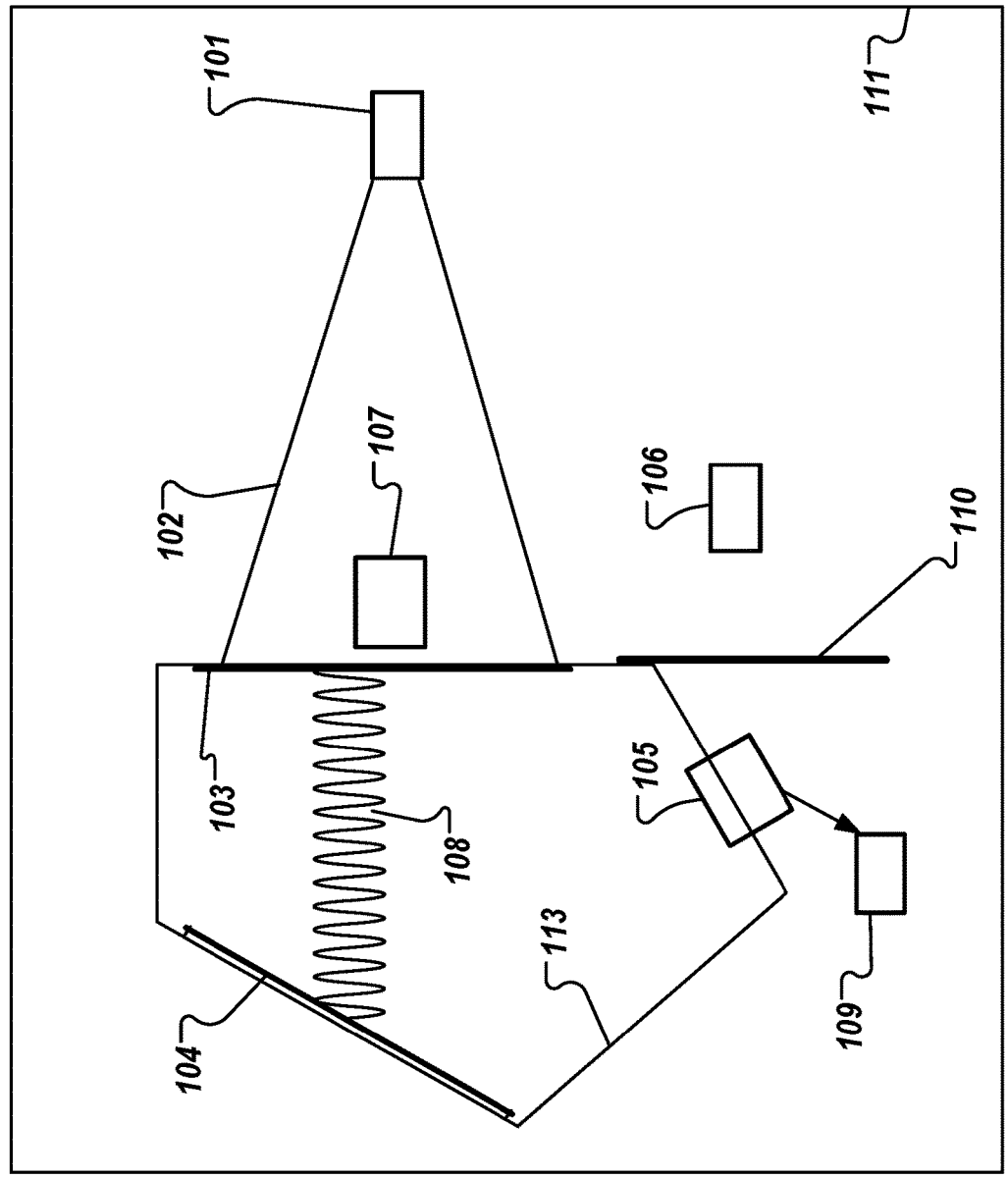
FIG. 1 depicts an example of an X-ray device.

FIG. 1 depicts an example of X-ray device 100. X-ray device 100 includes X-ray source 101 configured to emit X-rays 102 towards scintillator 103. As X-rays 102 pass through scan target 107 and collide with scintillator 103, the scintillator 103 may emit light 108. A single mirror 104 reflects the light 108 towards camera 105. Using a mirror to guide light emitted by scintillator 103 into the camera 105 enables positioning of the camera 105 outside of the primary beam of X-ray radiation 102, which can reduce the chances that X-ray radiation will damage the camera 105 and thus increase the lifetime and performance of the camera 105.

The X-ray source 101 is an apparatus that emits X-ray radiation. The scintillator 103 can include a material that emits visible, ultraviolet, and/or infrared light when excited by X-ray radiation. Camera 105 can be an apparatus or device configured to detect visible, ultraviolet, or infrared light. In some implementations. X-ray device 100 includes a motion system 106 configured to move, reposition, manoeuvre, or otherwise manipulate the camera 105 and/or the scan target 107 relative to the X-ray source 101 (e.g., the X-ray source 101 can be moved in some implementations).

A mount 113 supports the scintillator 103, the mirror 104, and the camera 105. An enclosure 111 surrounds the X-ray source 101, the scintillator 103, the mirror 104, the camera 105, the motion system 106, the scan target 107, and the mount 113, as well as other components of the X-ray device 100.

In some implementations, the camera 105 includes an optical camera, a charge-coupled device (CCD) camera, a photodiode, or any combination thereof. For example, an optical camera can include a complementary metal-oxide semiconductor (CMOS) digital camera sensor. Alternatively or additionally, an optical camera can include a red-green-green-blue (RGGB) Bayer filter and/or a monochromatic optical camera. In some examples, an optical camera can include a back-side-illuminated sensor and/or front-side-illuminated sensor. As an example, camera 105 can be configured to detect infrared light, ultraviolet light, and/or visible light 108.

In some implementations, camera 105 is positioned on the opposite side of scintillator 103 and shroud 110 from X-ray source 101 such that the shroud 110 blocks and protects camera 105 from stray visual light and/or X-rays 102 emitted from X-ray source 101. The shroud 110 can be a covering that blocks visible, ultraviolet, and/or infrared light from reaching the camera 105. Stray light is visible light, infrared light, and/or ultraviolet light that affects the camera by contributing noise above the read-noise of the camera.

The camera 105 is oriented at an angle relative to the y-axis, which can help to reduce the size of the detection subsystem, which includes the scintillator 103, the mirror 104, and the camera 105. The size of the detection subsystem (or detector assembly or the field-of-view of the camera contained therein) can refer to either one of the dimensions along a horizontal or vertical direction, e.g., X or Y direction, or both the horizontal, vertical, and depth dimensions, e.g., X and Y area, or all three spatial directions, e.g., X, Y and Z volume. The camera 105 being angled relative to the scintillator 103 can lead to a type of optical path for light emitted by the scintillator reflecting off of the mirror 104 twice before entering the camera 105. This type of optical path will be referred to as a "triple reflection." as the light reflects three times (twice off of the mirror 104 and once off of the scintillator 103) before the camera 105 receives the triply reflected light.

In some implementations, triply reflected light in an X-ray device can cause problems during three-dimensional (3D) reconstruction of a scan target 107. For example, X-ray device 100 can include a computer 109 configured to receive data from the camera 105. The computer 109 can be one or more computers that are integrated with camera 105, included in the detector assembly in the X-ray device 101, and/or located remotely from the X-ray device 101 (e.g., at a server farm and communicatively coupled with the X-ray device 101, e.g., over the Internet.

The camera 105 can be configured to generate data (e.g., radiographs) using detected light. In some implementations, the data includes an intensity and wavelength of light for each pixel. The computer 109 can be configured to execute an algorithm for 3D construction that uses the data (and optionally known information about the geometry of the arrangement of the scintillator 103, the mirror 104, and the camera 105) in order to reconstruct a 3D model of the scan target 107 based on the light produced by the scintillator 103. By mapping the location of where a particular light ray originated on the scintillator 103 to a pixel location or voxel location for 3D images, the computer 109 can associate an orientation, e.g., direction of light ray, for the light entering the camera 105. In some implementations, the algorithm can presume that light that reaches the camera 105 has only undergone one reflection off of the mirror 104 along the optical path from the scintillator 103 to the camera 105, and optionally use this information to facilitate the 3D reconstruction. Accordingly, the algorithm can provide an improved 3D reconstruction of the scan target 107 from the acquired data (e.g., the radiographs) since triple reflections are avoided by carefully selecting the sizes, positions, and orientations of the scintillator 103, the mirror 104, and the camera 105 in the detector assembly. Note that the triple reflections that are avoided can include specular or diffuse reflections off of the scintillator 103.

Figure 2A:
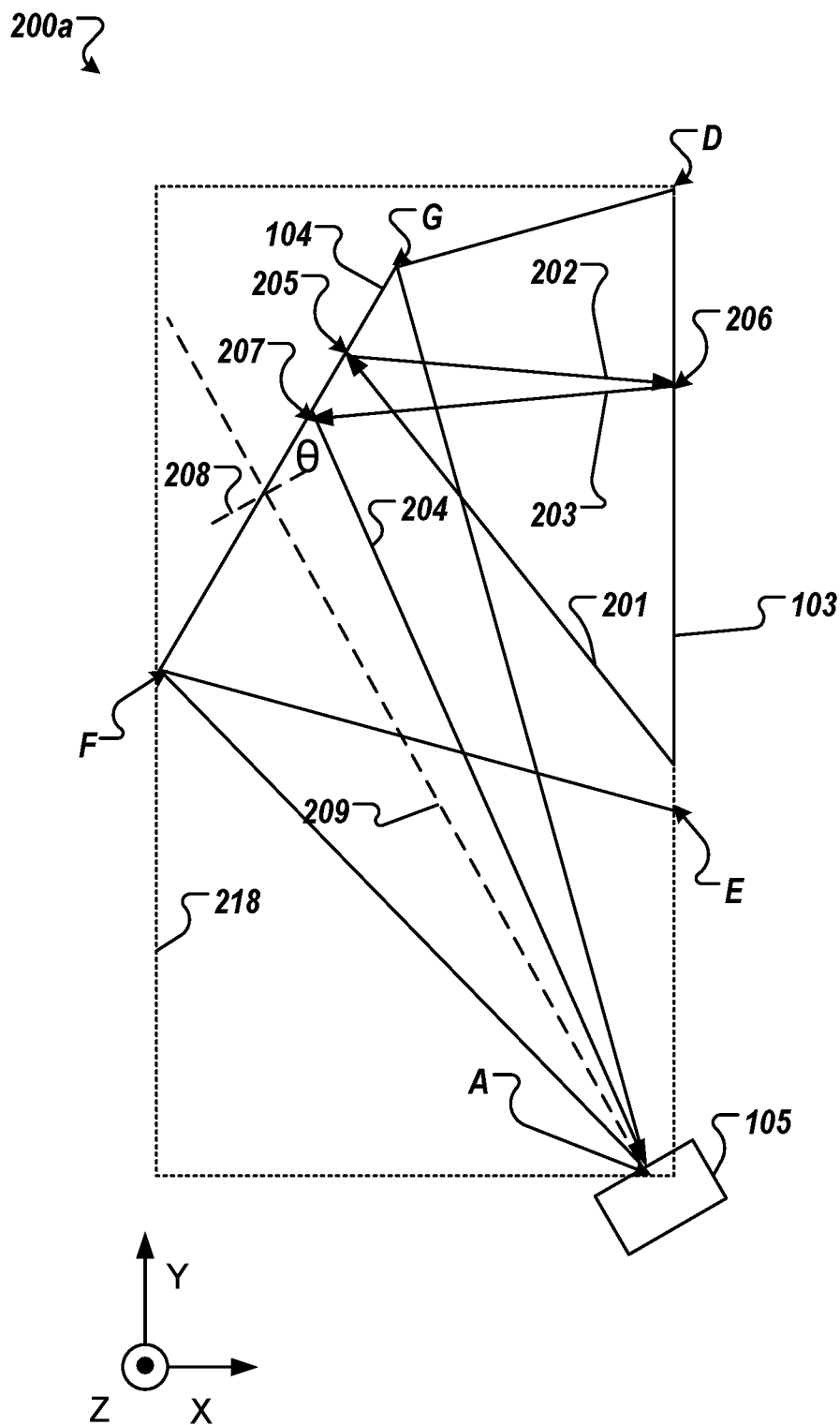
FIG. 2A depicts an example of a detection subsystem, which includes a scintillator, a mirror, and a camera, of an X-ray device that yields specular triple reflections.

FIG. 2A depicts an example of a detection subsystem 200a, which includes the scintillator 103, the mirror 104, and the camera 105, that yields specular triple reflections. As an example, a full optical path with a triple reflection can include optical paths 201, 202, 203, and 204. Light generated by the scintillator 103 can propagate at any angle between 0 to 180° as measured from +Y direction in a counter-clockwise direction. This particular example follows the optical path 201 of light generated by the scintillator 103. When light following optical path 201 encounters the mirror 104, the light undergoes specular reflection. In this disclosure, specular reflection refers to reflections where the angle of incidence is equal to the angle of reflectance. Accordingly, the angle of reflection off of the mirror 104 it is determined by the direction of the optical path 201 and the orientation of mirror 104.

After first reflection 205, the light continues onto optical path 202 towards the scintillator 103. The light undergoes second reflection 206, which can be specular or diffuse, e.g., the angle of incidence is not equal to the angle of reflectance, on the scintillator 103. In this example, second reflection 206 is specular, which causes the light to travel on optical path 203 toward the mirror 104. The light undergoes a third reflection 207 on the mirror 104 and then travels toward the camera 105. Such a triple reflection can create an artifact that interferes with 3D reconstruction. In some implementations, an artifact occurs when a pixel or voxel that is mapped to two different locations in space because some light is coming via single reflections and some light is coming from triple reflections.

Triple reflections only reach the camera 105 under certain geometrical conditions. The placement and dimensions of the scintillator 103 can be selected from a wide range of options, as desired for a particular implementation. The parameters of the scintillator 103, e.g., size, orientation, and location, depend on the size of the scan target 107 and the desired resolution of the 3D model created by 3D reconstruction. Given a particular scintillator size, the position and orientation of the scintillator 103, the sizes, positions, and orientations of the mirror 104 and camera 105 are determined in accordance with the present invention to reduce (or minimize) the size of the folded field-of-view of the camera 105, and thus the size of the detector assembly 200a, while also reducing (or eliminating) imaging artifacts that would be caused by triple reflections.

An angle θ can determine the orientation of the mirror 104 relative to the camera 105. The angle θ is the angle between the reflecting side of mirror 104 and a plane 208 perpendicular to an optical axis 209 of the camera 105. Note that if the optical axis 209 were parallel with the scintillator 103 and the angle θ were 45 degrees, then no triple reflections could occur, but the folded field-of-view of the camera 105 would still take up a substantial amount of space in the X-ray device 100. By reducing the angle θ from 45 degrees, the volume of the folded field-of-view of the camera 105 (and thus the volume of the detection subsystem) is reduced, but the angle θ should not be reduced so much as to allow triple specular reflections to occur, as depicted in FIG. 2A.

The field-of-view of the camera 105 determines what light emitted by the scintillator 103 reaches the camera 105. In this example, the field-of-view of the camera corresponds to the points A, D, and E. Point A is a focal point of the camera 105, e.g., the apex of the view cone of the camera. In some implementations, points D and E are the edges of the scintillator 103, so that the distance between points D and E is the length of the scintillator. This means that none of the scintillator 103 is outside the field-of-view of the camera 105, and none of the field-of-view of the camera 105 is wasted by including something other than the scintillator 103 therein.

Figure 2B:
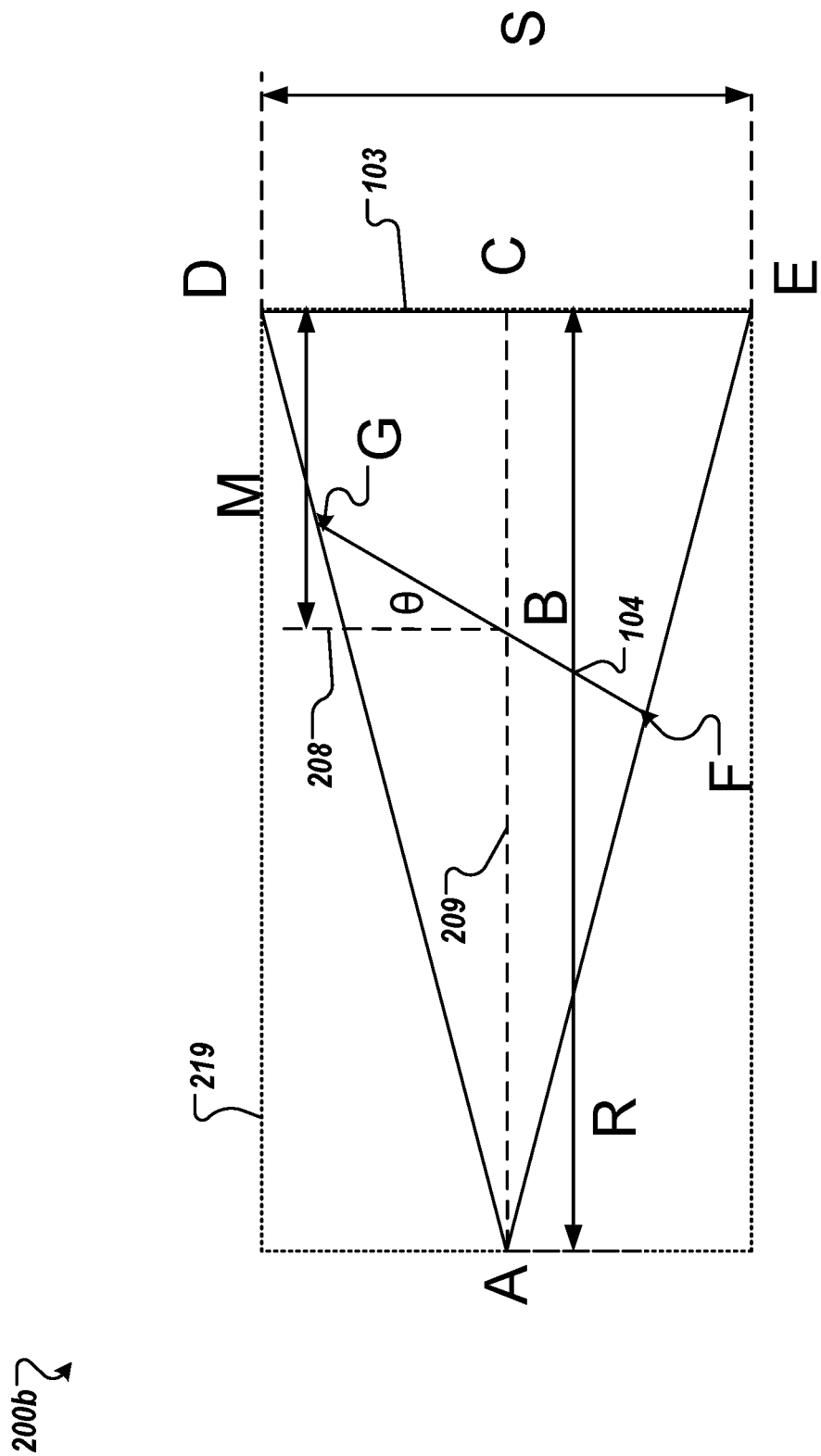
FIG. 2B depicts an unfolded view of the detection subsystem of FIG. 2A that is adjustable to create a configuration that prevents specular triple reflections.

In FIG. 2A, the field-of-view is folded by the mirror 104. In other words, a volume of the folded field-of-view is less than a volume of the unfolded field-of-view, since the volume of space containing the field-of-view of the camera is reduced due to the presence of the mirror 104. For example, the volume of the field-of-view can be described as a bounding box, where the dimensions of the bounding box are determined by the size of the field-of-view between the camera 105, the mirror 104, and the scintillator 103. A bounding box can be the smallest rectangular volume necessary to contain the entire field-of-view. For example, with reference to FIGS. 2A and 2B, a bounding box volume of the folded field-of-view 218 can be 78% of the bounding box volume of the unfolded field-of-view 219. In FIGS. 2A and 2B, the volumes of the folded field-of-view 218 and the unfolded field-of-view 219 can be different, because although the depth of each bounding box. e.g., dimension along the Z axis, is the same, the area in the XY plane is different.

The field-of-view can also be described by two angles defining the ranges in a horizontal, e.g., in the XY plane, direction and a depth direction, e.g., along the Z axis. In some implementations, the field-of-view is 20 by 31 square degrees. Visualizing the field-of-view of the camera 105, and how to adjust the relative positions and orientations of the mirror 104 and camera 105 with respect to the scintillator 103, can be simplified by unfolding the field-of-view.

FIG. 2B depicts an unfolded view 200b of the detection subsystem 200a that is adjustable to create a configuration that prevents specular triple reflections. Compared to FIG. 2A, the field-of-view beyond the mirror 104 in FIG. 2B is flipped about an axis coincident with the orientation of the mirror 104. Accordingly, point F and G lie in straight lines A-F-E and A-G-D in FIG. 2B, whereas the points F and G are locations of corners of the folded field-of-view in FIG. 2A. The transformation between FIGS. 2A and 2B is possible because the mirror 104 reflects light about the axis normal to a surface of the mirror 104.

Points A. D, and E are the same as points A. D, and E in FIG. 2A. Point B is the location of the intersection of the optical axis 209 with the mirror 104. Point C is the location of the intersection of the optical axis 209 with the scintillator 103. The angle θ is the same angle from FIG. 2A. e.g., the angle between plane 208 and mirror 104. Using these points, the following distances are defined: the distance from the camera 105 to the scintillator 103 is R=|A−C|, the distance from the mirror to the scintillator is M=|B−C|, and the size of the scintillator 103 is S=|D−E|. In some implementations, the size of the mirror 104, e.g., the distance from point G to point F, is less than size of the scintillator S. In some implementations, to allow for error in the mechanical alignment of the X-ray device 100, either the mirror or scintillator is not fully commensurate with the field of view of the camera.

The angle at which the specular triple reflection occurs is a function of the distance from the camera to the scintillator R, the distance of the mirror to the scintillator M, and the size of the scintillator S. Using the definitions above, a threshold angle $\theta_S$ for determining whether triply specular reflected light from the scintillator 103 reaches the camera 105 is:

$$\theta_S = \cot^{-1}\left[2\sqrt{\frac{b^2 - 3ac}{9a^2}}\cos\left[\frac{1}{3}\cos^{-1}\left(\frac{2b^3 - 9abc + 27a^2d}{6a(3ac - b^2)}\sqrt{\frac{9a^2}{b^2 - 3ac}}\right)\right] - \frac{b}{3a}\right],$$

where $$a = \frac{S}{2}(R^2 + MR - M^2),\ b = -M\left(R^2 + MR + \frac{S^2}{4}\right),\ c = \frac{SMR}{2},\ \text{and}\ d = \frac{S^2R}{4}.$$

Threshold angle $\theta_S$ is a transition point, above which specular triple reflections are avoided and below which specular triple reflections occur. Accordingly, configuring detection subsystem 200a to have an angle θ greater than or equal to $\theta_S$ can reduce or eliminate unwanted specular triple reflections, e.g., "specular triple reflections" meaning three reflections (two off of the mirror 104 and one off of the scintillator 103) that are each specular. Thus, some implementations select the sizes, positions and orientations of the mirror 104 and the camera 105 (with respect to a predetermined size, position and orientation of the scintillator 103)

to keep the angle θ above (or equal to) the threshold angle θ_S, thus ensuring no triple specular reflections can interfere with 3D reconstruction.

Figure 2C:
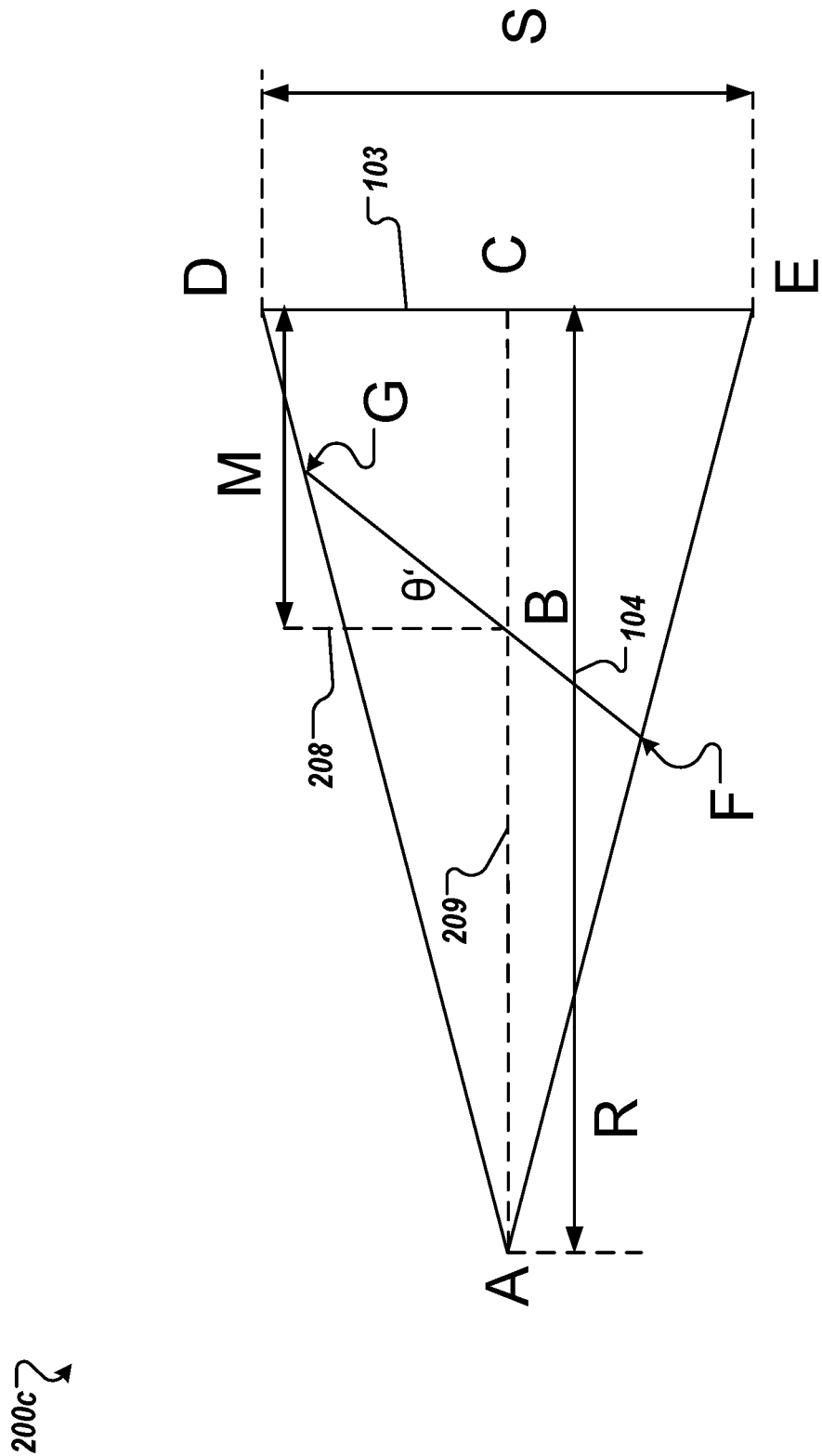
FIG. 2C depicts an unfolded view of a detection subsystem that prevents specular triple reflections.

FIG. 2C depicts an unfolded view of a detection subsystem 200c that prevents specular triple reflections. FIG. 2C is similar to FIG. 2B, except that θ' is greater than θ and θ_S, meaning that specular triple reflections triple reflections are avoided. In other words, there is no optical path from the scintillator 103 to the camera 105 that involves three specular reflections.

Figure 3A:
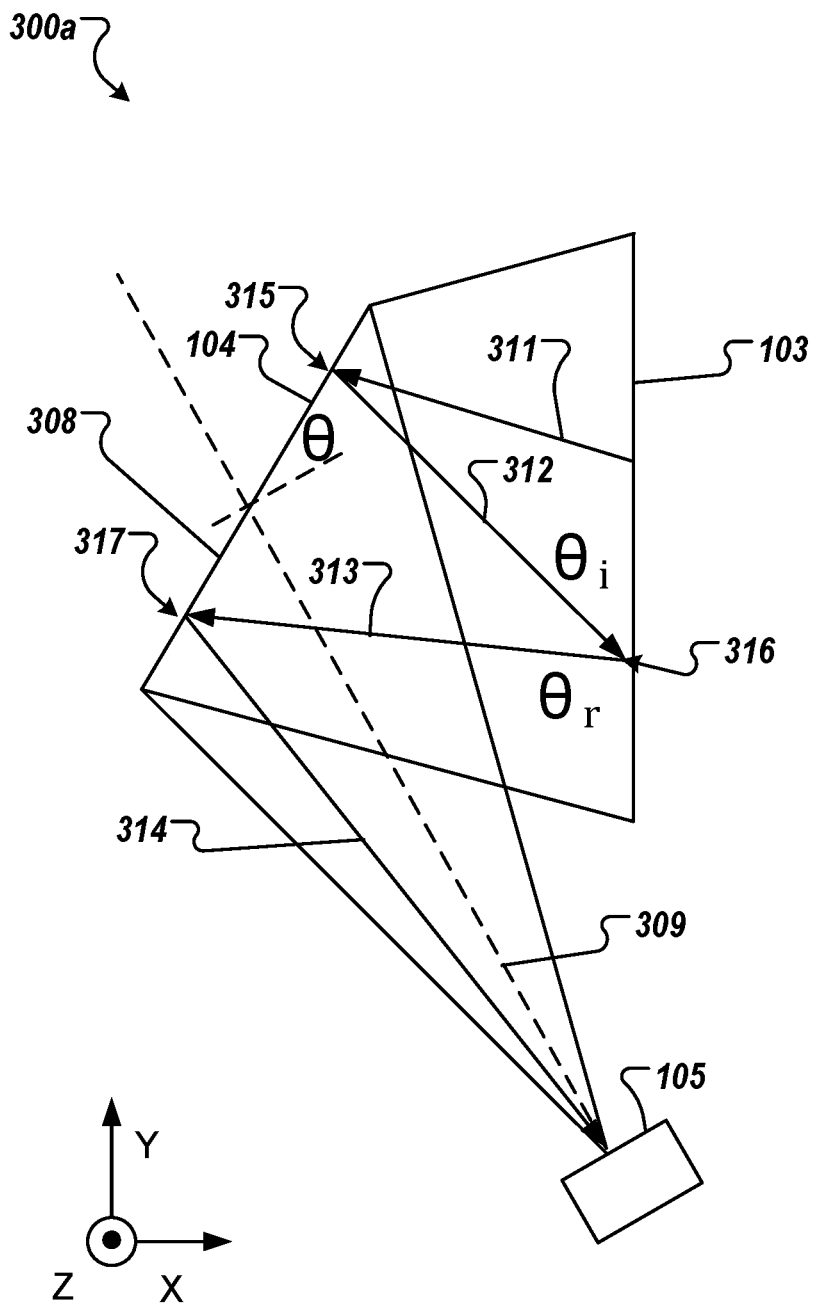
FIG. 3A depicts an example of a detection subsystem, which includes a scintillator, a mirror, and a camera, of an X-ray device that is adjustable to create a configuration that permits diffuse triple reflections.

However, triple reflections do not always include just specular reflections. FIG. 3A depicts an example of a detection subsystem 300a, which includes the scintillator 103, the mirror 104, and the camera 105, of an X-ray device 100 that is adjustable to create a configuration that permits diffuse triple reflections. An example of a complete optical path includes optical paths 311, 312, 313, and 314. Light emitted from the scintillator 103 follows optical path 311 toward the mirror 104 before reflecting off of the mirror 104 at specular reflection 315. Then the light travels along optical path 312 and undergoes a diffuse reflection 316. As can be seen in in FIG. 3A, the angle of incidence θ_i is not equal to the angle of reflectance θ_r at diffuse reflection 216. Then the light follows optical path 313 before undergoing specular 317 reflection off of the mirror 104. Finally, the light follows optical path 314, which leads to the camera 105.

Similarly to detection subsystem 200a, the camera 105 can define an optical axis 309, and the mirror can intersect a plane 308 perpendicular to the optical axis 309 at an angle θ. A second angle threshold θ_D for determining whether diffuse triple reflections occur is:

$$\theta_D = \cot^{-1}\left(\frac{-\frac{S^2}{4} - MR + \sqrt{\frac{S^4}{16} + \frac{3S^2 MR}{2} M^2 R^2 - 8M^2 R^2}}{S(M - 2R)}\right).$$

Threshold angle θ_D is a transition point, above which diffuse triple reflections are avoided and below which diffuse triple reflections occur, "diffuse triple reflections" meaning three reflections including two specular reflections off of the mirror 104 and one diffuse reflection off of the scintillator 103. For all configurations, θ_S≤θ_D. Accordingly, to avoid both specular and diffuse triple reflections, the detection subsystem 300a should be configured such that θ_D≤θ. Thus, some implementations select the sizes, positions and orientations of the mirror 104 and the camera 105 (with respect to a predetermined size, position and orientation of the scintillator 103) to keep the angle θ above (or equal to) the threshold angle θ_D, thus ensuring no triple diffuse reflections can interfere with 3D reconstruction.

In some implementations, keeping the angle θ above (or equal to) the threshold angle θ_D is not necessary. Diffuse triple reflections are generally less luminous than specular triple reflections to the camera 105, e.g., less light from diffuse triple reflections enters camera 105 than light from specular triple reflections. Diffuse triple reflections can be less luminous than specular triple reflections for a variety of reasons. For example, the surface of the scintillator 103 can be relatively smooth and thus mostly permit specular reflections, but have small regions of roughness that permit diffuse reflections. By definition, mirrors permit specular reflection, so mirror 104 generally does not permit diffuse reflections. Mirrors with defects such as scratches can permit diffuse reflections at the locations of the defects, though. As another example, the geometry of the configuration of the scintillator 103, mirror 104, and camera 105 can be such that light following an optical path including only specular reflections is more likely to enter the camera 105 than light with a diffuse reflection with a random angle determining one of the legs of the optical path. Accordingly, mitigating the effects of diffuse triple reflections can be less of a concern than mitigating the effects of specular triple reflections. Thus, the size of the folded field-of-view of the camera (and likewise the size of the detection subsystem) can be reduced further by allowing triple diffuse reflections while preventing triple specular reflections. Accordingly, in some implementations, a structural constraint on the geometry of the detection subsystem 200a can be to allow diffuse triple reflections, but prevent specular triple reflections: θ_S≤θ<θ_D, as depicted in FIG. 3A.

Figure 3B:
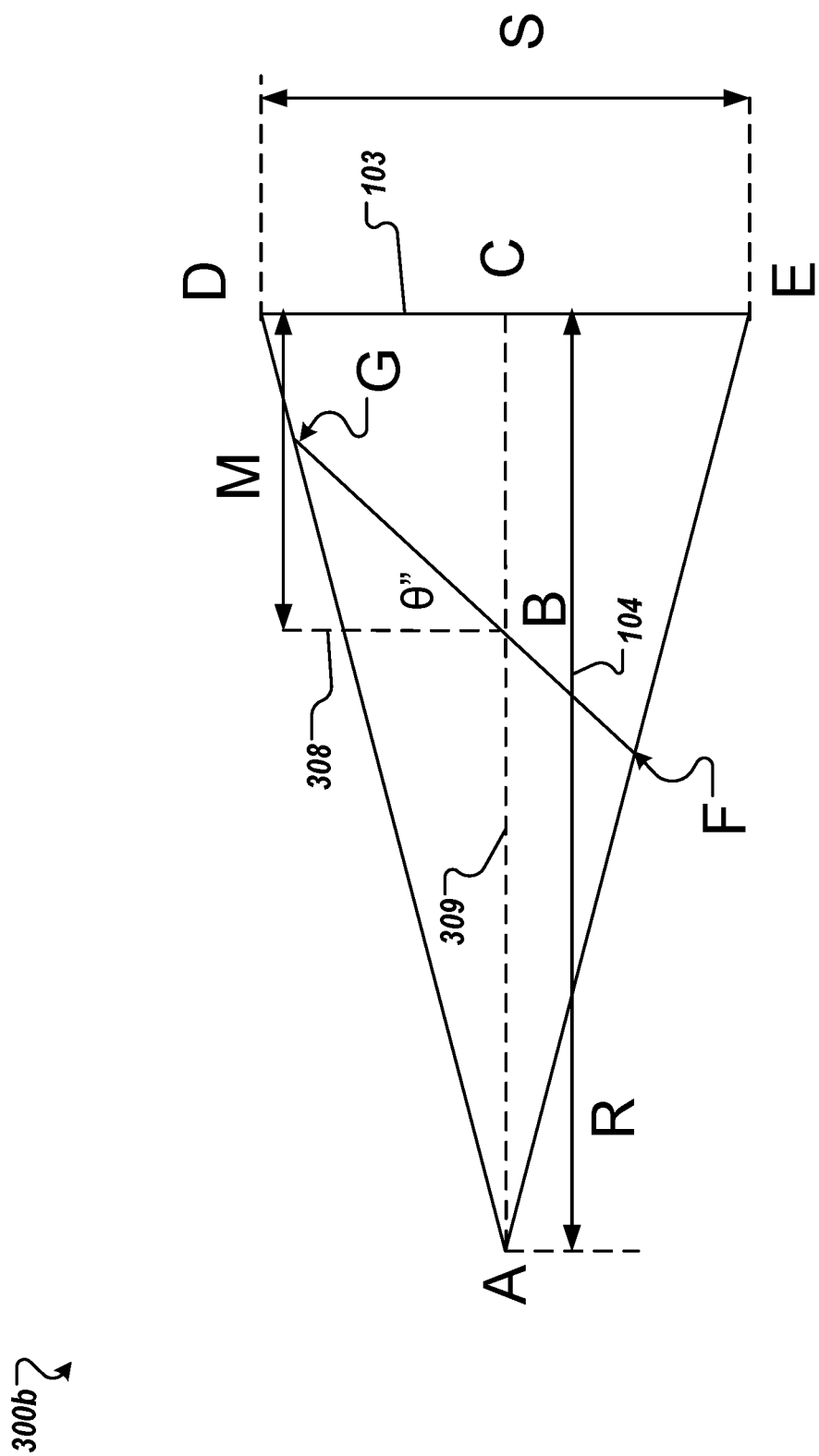
FIG. 3B depicts an unfolded view of the detection subsystem that prevents both specular triple reflections and diffuse triple reflections.

FIG. 3B depicts an unfolded view of a detection subsystem 300b that prevents both diffuse and specular triple reflections. FIG. 3B is similar to FIG. 2C, except that θ" not only has the requirement of being greater than θ_S, but also of being greater than θ_D.

Preventing triple reflections, e.g., n=3, also prevents higher-order reflections, e.g., n=5 or 7. In general, the order of reflections is odd, since most arrangements only allow for the last reflection to be off of the mirror 108. Higher order reflections typically contribute very little to the light received by the camera 105.

In some implementations, the geometry of detection subsystems can be determined such that the angle θ is greater than either θ_S or θ_D with some clearance to allow for build defects in the X-ray device 100. For example, the angle θ can be greater than either θ_S or θ_D by 5%.

One having ordinary skill in the art will readily understand that the implementations discussed above may be practiced with procedures in a different order, and/or with hardware elements in configurations which are different than those which are disclosed. Therefore, although some implementations have been described based upon these some implementations, it would be apparent to those of skill in the art that certain modifications, variations, and alternative constructions would be apparent, while remaining within the spirit and scope of the implementations.

I claim:

1. An X-ray device comprising:
an X-ray source configured to emit X-rays;
a scintillator arranged to absorb, on a first side of the scintillator, the X-rays after interaction with an object that has been placed in the X-ray device, the scintillator being configured to emit light from a second side of the scintillator in response to absorption of the X-rays;
a single mirror arranged to reflect the light from the second side of the scintillator toward a camera; and
the camera arranged to receive the light reflected from the single mirror; wherein
the camera has a field-of-view around an optical axis of the camera,
the single mirror is large enough to fully contain the field-of-view as the field-of-view is folded by the single mirror toward the scintillator,
the single mirror is positioned at an angle with respect to a plane that is normal to the optical axis at a point where the optical axis intersects the single mirror,
the angle is decreased from forty-five degrees to reduce a volume of the folded field-of-view of the camera, and
the angle is greater than or equal to a threshold angle that prevents triple specular reflections of light between the single mirror and the scintillator, the threshold angle being set in accordance with (i) a first distance along the optical axis between the camera and the scintillator, (ii) a second distance along the optical axis between the single mirror and the scintillator, and (iii) a size of the scintillator.

2. The X-ray device of claim 1, wherein the angle of the single mirror with respect to the plane is less than an additional threshold angle that prevents a combination of double specular reflections of light off of the single mirror and a single diffuse reflection of light off of the scintillator.

3. The X-ray device of claim 1, wherein the angle of the single mirror with respect to the plane is greater than an additional threshold angle that prevents a combination of double specular reflections of light off of the single mirror and a single diffuse reflection of light off of the scintillator.

4. The X-ray device of claim 1, wherein a field-of-view of the camera is 20 by 31 square degrees.

5. The X-ray device of claim 1, further comprising a shroud positioned to block stray light from affecting the camera.

6. The X-ray device of claim 5, wherein the shroud is positioned between the X-ray source and the camera.

7. The X-ray device of claim 1, further comprising a motion system to move the camera, the object, or both during a scan.

8. A system comprising:
the X-ray device of claim 1; and
a computer programmed to execute an algorithm to perform three-dimensional reconstruction of the object using data generated by the light received by the camera.

9. An X-ray device comprising:
an X-ray source configured to emit X-rays;
a scintillator arranged to absorb, on a first side of the scintillator, the X-rays after interaction with an object that has been placed in the X-ray device, the scintillator being configured to emit light from a second side of the scintillator in response to absorption of the X-rays;
a single mirror arranged to reflect the light from the second side of the scintillator toward a camera; and
the camera arranged to receive the light reflected from the single mirror; wherein
the camera has a field-of-view around an optical axis of the camera,
the single mirror is large enough to fully contain the field-of-view as the field-of view is folded by the single mirror toward the scintillator,
the single mirror is positioned at an angle with respect to a plane that is normal to the optical axis at a point where the optical axis intersects the single mirror,
the angle is decreased from forty-five degrees to reduce a volume of the folded field-of-view of the camera,
the angle is greater than or equal to a threshold angle that prevents triple specular reflections of light between the single mirror and the scintillator, the threshold angle being set in accordance with (i) a first distance along the optical axis between the camera and the scintillator, (ii) a second distance along the optical axis between the single mirror and the scintillator, and (iii) a size of the scintillator, and
a bounding box volume of the folded field-of-view of the camera is 78% of a bounding box volume of an unfolded field-of-view of the camera.

10. The X-ray device of claim 9, wherein the angle of the single mirror with respect to the plane is less than an additional threshold angle that prevents a combination of double specular reflections of light off of the single mirror and a single diffuse reflection of light off of the scintillator.

11. The X-ray device of claim 9, wherein the angle of the single mirror with respect to the plane is greater than an additional threshold angle that prevents a combination of double specular reflections of light off of the single mirror and a single diffuse reflection of light off of the scintillator.

12. The X-ray device of claim 9, further comprising a shroud positioned to block stray light from affecting the camera.

13. The X-ray device of claim 12, wherein the shroud is positioned between the X-ray source and the camera.

14. The X-ray device of claim 9, further comprising a motion system to move the camera, the object, or both during a scan.

15. A system comprising:
the X-ray device of claim 9; and
a computer programmed to execute an algorithm to perform three-dimensional reconstruction of the object using data generated by the light received by the camera.

* * * * *